United States Patent
Uesugi et al.

(10) Patent No.: US 11,043,200 B2
(45) Date of Patent: Jun. 22, 2021

(54) SOUND CONTROL DEVICE FOR VEHICLE

(71) Applicant: MAZDA MOTOR CORPORATION, Hiroshima (JP)

(72) Inventors: Naohisa Uesugi, Yokohama (JP); Yasuhiko Miura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/650,678

(22) PCT Filed: Oct. 4, 2018

(86) PCT No.: PCT/JP2018/037267
§ 371 (c)(1),
(2) Date: Mar. 25, 2020

(87) PCT Pub. No.: WO2019/070038
PCT Pub. Date: Apr. 11, 2019

(65) Prior Publication Data
US 2020/0251083 A1 Aug. 6, 2020

(30) Foreign Application Priority Data
Oct. 6, 2017 (JP) .............................. JP2017-195764

(51) Int. Cl.
*G10K 11/178* (2006.01)
(52) U.S. Cl.
CPC .... *G10K 11/178* (2013.01); *G10K 2210/1282* (2013.01)
(58) Field of Classification Search
CPC ..................... G10K 2210/1282; G10K 11/178
(Continued)

(56) References Cited

U.S. PATENT DOCUMENTS

| 8,634,571 B2 | 1/2014 | Sakamoto et al. |
| 9,299,337 B2 | 3/2016 | Hera et al. |

(Continued)

FOREIGN PATENT DOCUMENTS

| JP | 2006-193002 A | 7/2006 |
| JP | 2008-230341 A | 10/2008 |

(Continued)

OTHER PUBLICATIONS

International Search Report issued in PCT/JP2018/037267; dated Jan. 8, 2019.

*Primary Examiner* — Paul Kim
(74) *Attorney, Agent, or Firm* — Studebaker & Brackett PC (57) ABSTRACT

A vehicle sound control device includes: a motor rotation speed detector (2) configured to detect the rotation speed of a motor that drives a vehicle; a speaker (4) configured to produce a vehicle interior sound including a motor sound changing in accordance with the rotation speed of the motor in an interior of the vehicle; an emphasizing order setting unit (6) configured to determine an order component to be emphasized in the motor sound in accordance with the rotation speed detected by the motor rotation speed detector (2); and a vehicle interior sound control unit (7) configured to control the vehicle interior sound produced by the speaker (4) so that the emphasizing order component determined by the emphasizing order setting unit (6) is emphasized. The emphasizing order setting unit (6) determines the order component to be emphasized so that a higher order component is emphasized as the rotation speed increases.

7 Claims, 5 Drawing Sheets

(58) Field of Classification Search
USPC .......................................................... 381/71.4
See application file for complete search history.

(56) References Cited

U.S. PATENT DOCUMENTS

| | | |
|---|---|---|
| 2011/0206213 A1 | 8/2011 | Sakamoto et al. |
| 2012/0177214 A1 | 7/2012 | Hera et al. |
| 2016/0180832 A1 | 6/2016 | Hera et al. |
| 2016/0284334 A1* | 9/2016 | Hera ..................... G10K 15/02 |

FOREIGN PATENT DOCUMENTS

| | | |
|---|---|---|
| JP | 2009-298288 A | 12/2009 |
| JP | 2010-105414 A | 5/2010 |
| JP | 2014-507679 A | 3/2014 |
| JP | 2016-145885 A | 8/2016 |

* cited by examiner

SOUND CONTROL DEVICE FOR VEHICLE

TECHNICAL FIELD

The present disclosure relates to a vehicle sound control device that controls an interior sound of a vehicle.

BACKGROUND ART

In a vehicle such as an automobile, to enhance the realism of driving, a sound according to the driving operation (an engine sound) may be produced from an acoustic device (speaker) installed in the vehicle interior. As a technique of controlling such a vehicle interior sound properly, Patent Document 1 (Japanese Unexamined Patent Publication (Japanese Translation of PCT Application) No. 2014-507679), for example, discloses an invention in which the gain of a harmonic component of an engine sound is set in accordance with the engine load. Also, Patent Document 2 (Japanese Unexamined Patent Publication No. 2016-145885) discloses an invention in which the gain of an order component of an engine sound is adjusted to make the driver be informed of a G change associated with acceleration/deceleration of the vehicle (in a turning state). Patent Document 3 (Japanese Unexamined Patent Publication No. 2008-230341) discloses an invention in which the operation is switched between an antinoise control device and an engine effect sound producing device in accordance with the driving mode and the number of revolutions of the engine.

CITATION LIST

Patent Document

PATENT DOCUMENT 1: Japanese Unexamined Patent Publication (Japanese Translation of PCT Application) No. 2014-507679
PATENT DOCUMENT 2: Japanese Unexamined Patent Publication No. 2016-145885
PATENT DOCUMENT 3: Japanese Unexamined Patent Publication No. 2008-230341

SUMMARY OF THE INVENTION

Technical Problem

The acoustic device of the vehicle may also produce a sound (music, etc.) from an audio apparatus in addition to the engine sound, and the driver perceives the audio sound simultaneously with the engine sound. When the driver wants to concentrate on driving operation, such as when accelerating the vehicle, however, the audio sound may interfere with the perception of the engine sound. For this reason, the driver may find it difficult to grasp the driving state properly from the engine sound.

In view of the above circumstances, an objective of the present disclosure is providing a vehicle sound control device capable of controlling the sound produced in the interior of a vehicle to become an optimum state for grasping the driving state.

Solution to the Problem

To achieve the above objective, the present disclosure adopts the following solution. That is, a vehicle sound control device includes: a motor rotation speed detector configured to detect the rotation speed of a motor that drives a vehicle; a speaker configured to produce a vehicle interior sound including a motor sound changing in accordance with the rotation speed of the motor in an interior of the vehicle; an emphasizing order setting unit configured to determine an order component to be emphasized in the motor sound in accordance with the rotation speed detected by the motor rotation speed detector; and a vehicle interior sound control unit configured to control the vehicle interior sound produced by the speaker so that the emphasizing order component determined by the emphasizing order setting unit is emphasized, wherein the emphasizing order setting unit determines the order component to be emphasized so that a higher order component is emphasized as the rotation speed increases.

According to the above solution, for easy perception of the state of the motor (a change in the rotation speed of the motor) from the motor sound, a higher order component of the motor sound is emphasized as the rotation speed of the motor increases. Therefore, the occupant (driver) of the vehicle can perceive a change in motor sound associated with a change in driving state (the rotation speed of the motor) properly even while listening to an audio sound from an audio apparatus.

Preferred modes on the premise of the above solution are as follows. That is, the vehicle interior sound control unit may perform control of intensifying the emphasizing order component of the vehicle interior sound. In this case, since the emphasizing order component important for perception itself is emphasized, the perception of the vehicle occupant for the motor sound improves.

The vehicle interior sound control unit may perform control of weakening a component other than the emphasizing order component of the vehicle interior sound. In this case, since components other than the emphasizing order component are weakened, the order component important for perception is perceived as the motor sound, and thus the perception of the vehicle occupant for the motor sound improves.

The speaker can produce the motor sound and an audio sound from an audio apparatus, and the vehicle interior sound control unit may perform control of weakening a frequency component of the audio sound overlapping the emphasizing order component. In this case, since, the frequency component of the audio sound overlapping the emphasizing order component is weakened, the emphasizing order component of the motor sound is relatively intensified, and thus the perception of the vehicle occupant for the motor sound improves.

The vehicle sound control device may further includes a vehicle interior sound detector configured to detect a vehicle interior sound at an ear position of an occupant of the vehicle, and the vehicle interior sound control unit may produce, using the phase of the vehicle interior sound detected by the vehicle interior sound detector, the emphasizing order component of the motor sound having the same phase as the phase of the detected sound, or a component other than the emphasizing order component of the motor sound having the opposite phase to the phase of the detected sound. In this case, the vehicle interior sound is controlled using the detection result of the phase of the vehicle interior sound at an ear position of the occupant (driver) of the vehicle. Therefore, by producing a sound having the same phase as the detected phase or producing a sound having the opposite phase, the motor sound perceived by the driver can be controlled properly.

The emphasizing order setting unit may change the emphasizing order from second-order to fourth-order, sixth-order, and eighth-order in this order as the rotation speed of the motor increases. In this case, a higher order component (higher frequency component) of the motor sound is emphasized as the rotation speed of the motor increases. Therefore, the vehicle occupant can perceive an auditory change in the pitch of the motor sound with respect to a rise in the rotation speed of the motor sound in a more linear relationship.

Advantages of the Invention

According to the present disclosure, since a higher order component of a motor sound is emphasized as the rotation speed of the motor increases, a vehicle occupant can perceive the motor sound required for grasping the driving state (the rotation speed of the motor) properly even while listening to an audio sound.

DESCRIPTION OF EMBODIMENTS

An embodiment of the present disclosure will be described hereinafter with reference to the accompanying drawings.

Figure 1:
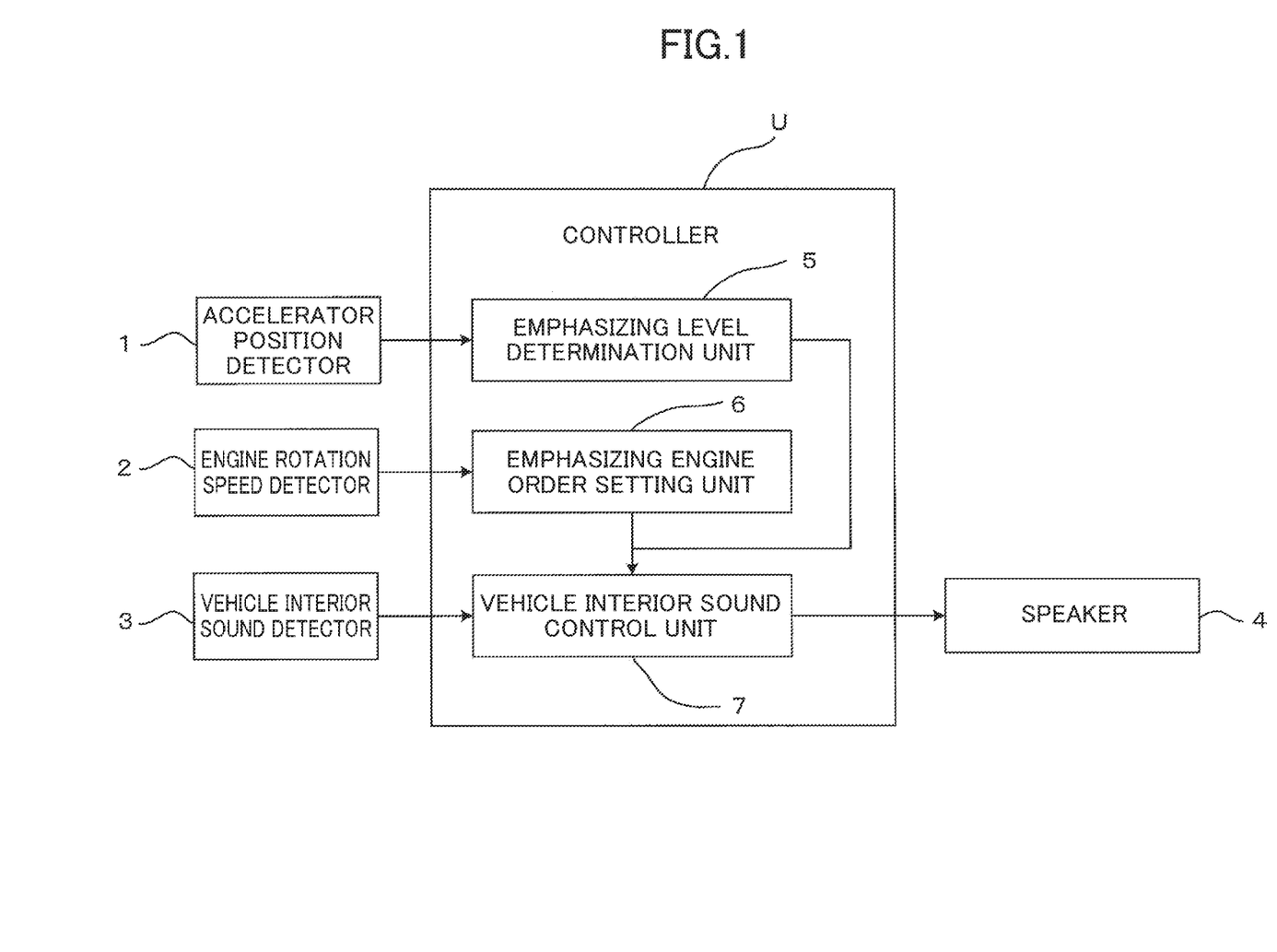
FIG. 1 is a block diagram showing an example of the control system according to the present disclosure.

FIG. 1 shows, as a block diagram, an example of the control system of the vehicle sound control device according to the present disclosure. As illustrated, the control system includes a controller (control unit) U configured using microcomputers. The controller U receives detected signals from an accelerator position detector 1 that detects the position of the accelerator of the vehicle (the degree with which the accelerator pedal is depressed), an engine rotation speed detector 2 that detects the engine rotation speed of the vehicle, and a vehicle interior sound detector 3 that detects information (the frequency, sound pressure, and phase) of a vehicle interior sound at an ear of an occupant (driver) of the vehicle. The vehicle interior sound detector 3 is constituted by a microphone, for example, placed adjacent to an ear of an occupant (driver) of the vehicle. The engine rotation speed detector 2 is an example of the motor rotation speed detector according to the present disclosure.

The control system also includes a speaker 4 that produces a vehicle interior sound. The speaker 4 can produce an engine sound of the vehicle and an audio sound (music, etc.) from an audio apparatus.

The controller U includes an emphasizing level determination unit 5, an emphasizing engine order setting unit 6, and a vehicle interior sound control unit 7. As will be detailed later, the vehicle interior sound (engine sound and audio sound) produced by the speaker 4 is to be adjusted into an optimum state for driving by the emphasizing level determination unit 5, the emphasizing engine order setting unit 6, and the vehicle interior sound control unit 7. The emphasizing engine order setting unit 6 is an example of the emphasizing order setting unit according to the present disclosure.

Figure 2:
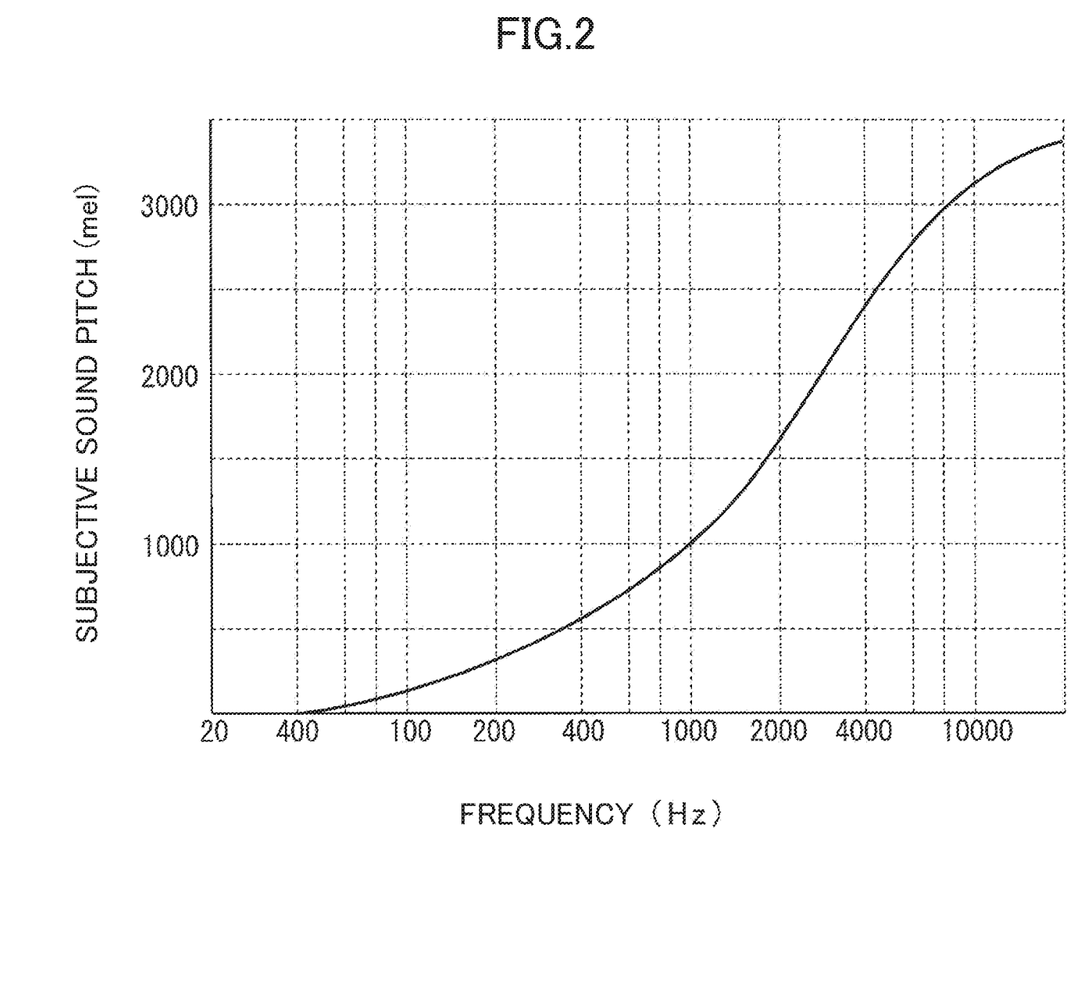
FIG. 2 is a graph showing the perception characteristics of humans for the pitch of a sound.

FIG. 2 is a graph showing the perception characteristics of humans for the pitch of a sound, illustrating the relationship between the frequency (Hz) of a sound and the subjective sound pitch (mel) sensed by humans. This graph is a semi-logarithmic graph with the x-axis (frequency) being a logarithmic scale. As is found from the graph, as the frequency of a sound is higher, the sensitivity of humans for the pitch of the sound decreases. In order for humans to sense a change in the pitch of the sound, therefore, it is necessary to change the frequency more greatly when the frequency is high than when it is low. Based on such a relationship, the present disclosure is to control the vehicle interior sound so that an occupant (driver) of the vehicle can perceive a rise in engine rotation speed properly from a change in engine sound.

Figure 3:
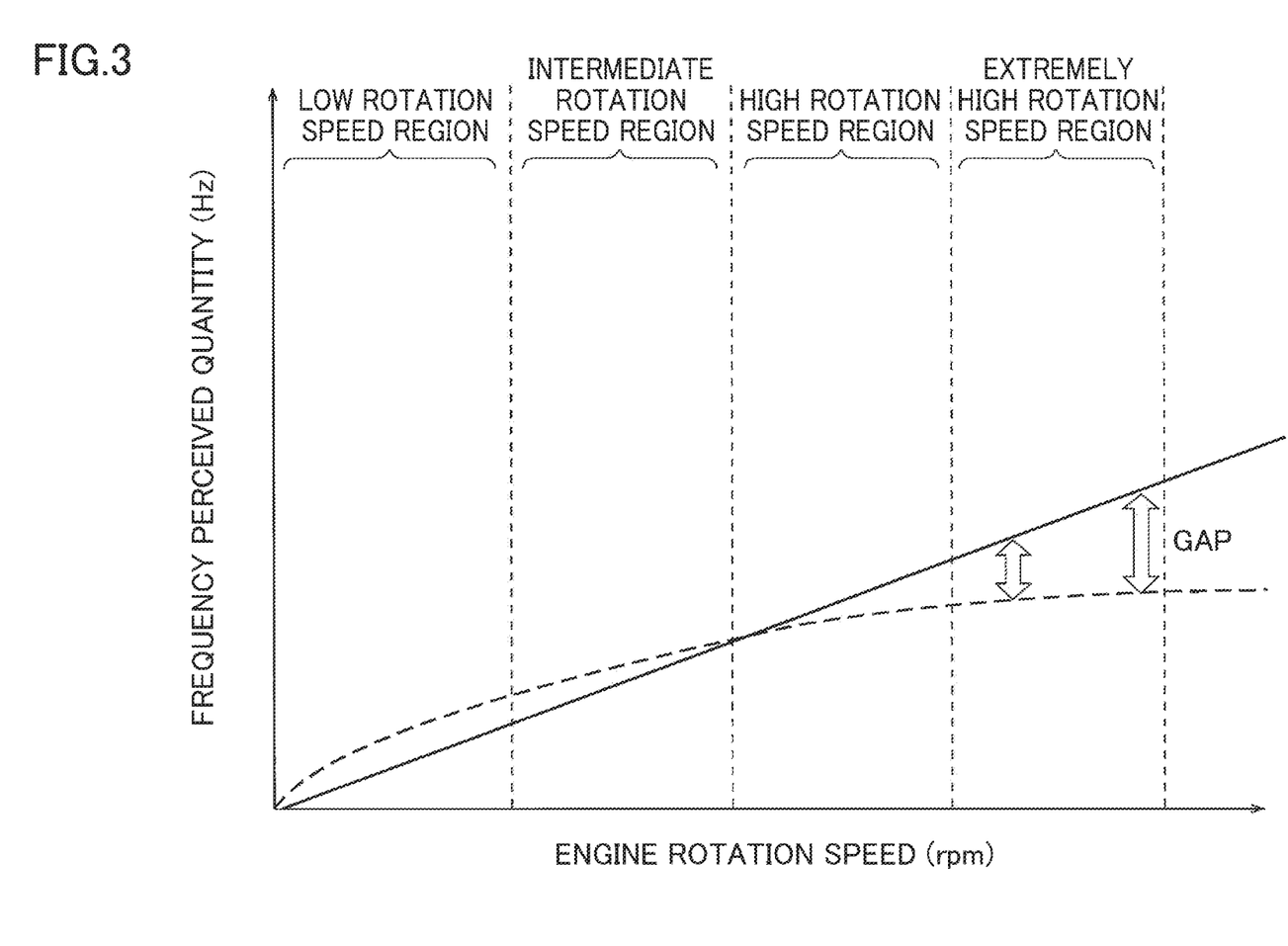
FIG. 3 is a graph showing the relationship between the engine rotation speed and the frequency perceived quantity.

FIG. 3 is a graph showing the relationship between the engine rotation speed and the frequency perceived quantity. In this graph, the actual relationship between the engine rotation speed and the frequency perceived by the vehicle driver (frequency perceived quantity) is represented by the dashed line. In order for the vehicle driver to grasp the engine state properly from his or her subjective evaluation, it is desired that the relationship between the engine rotation speed and the frequency perceived quantity is linear as represented by the solid line in FIG. 3. However, since the perception characteristics of the driver (see FIG. 2) are less sensitive to a change in the pitch of the sound as the frequency is higher as described above, a gap arises between the actual relationship between the engine rotation speed and the frequency perceived quantity represented by the dashed line and the linear relationship (ideal state) represented by the solid line. To solve this problem, according to the present disclosure, the relationship of the frequency perceived quantity by the driver with the engine rotation speed is made closer to the ideal state by adjusting the engine sound perceived by the driver.

Figure 4:
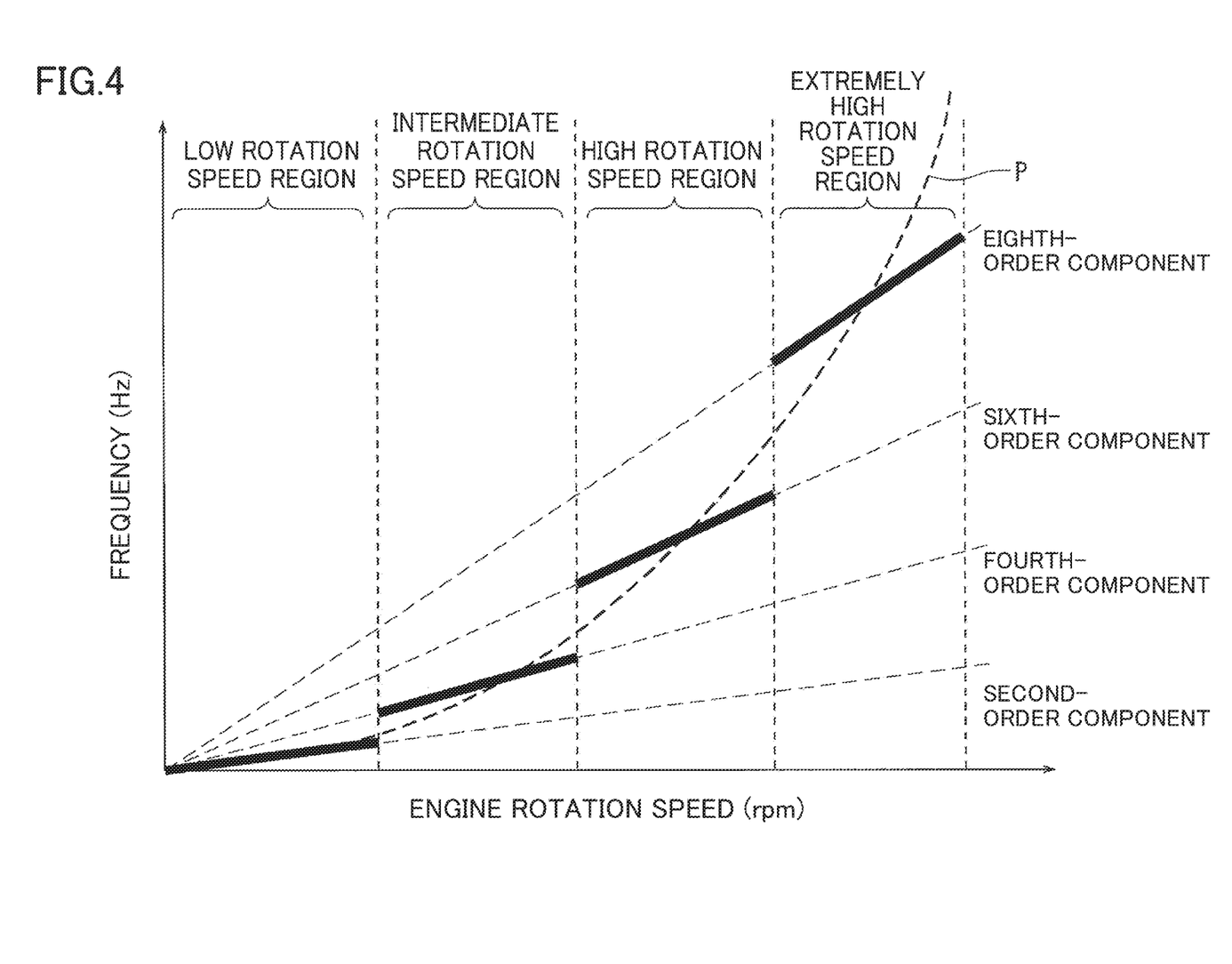
FIG. 4 is a graph showing the relationship between the engine rotation speed and the frequency (physical quantity).

FIG. 4 is a graph showing the relationship between the engine rotation speed and the engine sound frequency (physical quantity), where the x-axis represents the engine rotation speed (rpm) and the y-axis represents the frequency (Hz). As illustrated, the engine sound is constituted by a plurality of order components (in the illustrated example, a second-order component, a fourth-order component, a sixth-order component, and an eighth-order component), and the frequencies of these order components become higher in proportion to the engine rotation speed.

The engine sound becomes higher as the engine rotation speed rises. However, as described above with reference to FIG. 2, the vehicle occupant (driver) finds it harder to perceive a change in engine sound for the same rise amount of the engine rotation speed when the engine sound is higher than when it is low. According to the present disclosure, therefore, as the engine rotation speed rises, a higher-order component of the engine sound is emphasized, whereby the driver can easily perceive a change in engine sound.

To describe the above in detail, the present inventors have found that frequency perception characteristics as those shown by the solid line in FIG. 3 can be obtained by setting physical characteristics that the increase amount of the frequency becomes greater as the engine rotation speed rises, like an optimum line P in FIG. 4, as the correspondence between the engine rotation speed and the frequency (physical quantity). According to the present disclosure, therefore, the engine rotation speed is divided into four regions, and in each of the engine rotation speed regions, only the engine order component corresponding to the optimum line P, specifically only the bold-line portion in FIG. 4, is emphasized. That is, in the example shown in FIG. 4, the second-order component, fourth-order component, sixth-order component, and eighth-order component of the engine sound are respectively emphasized in the four engine rotation speed regions (a low rotation speed region, an intermediate rotation speed region, a high rotation speed region, and an extremely high rotation speed region). The emphasizing engine order setting unit 6 determines the order component to be emphasized (optimum engine order) for each engine rotation speed region in accordance with such a characteristic map.

The control of the vehicle interior sound (emphasis of an order component of the engine sound) by the vehicle interior sound control unit 7 is executed in the following methods (1) to (3), for example. The control methods (1) to (3) of the vehicle interior sound are well-known techniques in the antinoise control as are described in the above-cited Patent Documents 1 to 3.

(1) The sound of the order component to be emphasized (optimum engine order) is intensified. In this case, the sound of the optimum engine order is intensified by producing a sound of the optimum engine order having the same phase as the phase detected by the vehicle interior sound detector 2.

(2) The sound of an engine order other than the optimum engine order is weakened. In this case, the sound of an engine order other than the optimum engine order is attenuated by producing a sound of an engine order other than the optimum engine order having the opposite phase to the phase detected by the vehicle interior sound detector 2, thereby resulting in emphasizing the optimum engine order.

(3) The frequency component of an audio sound corresponding to the optimum engine order is attenuated.

The emphasizing level (gain) of the optimum engine order is determined based on the accelerator position detected by the accelerator position detector 1.

Figure 5:
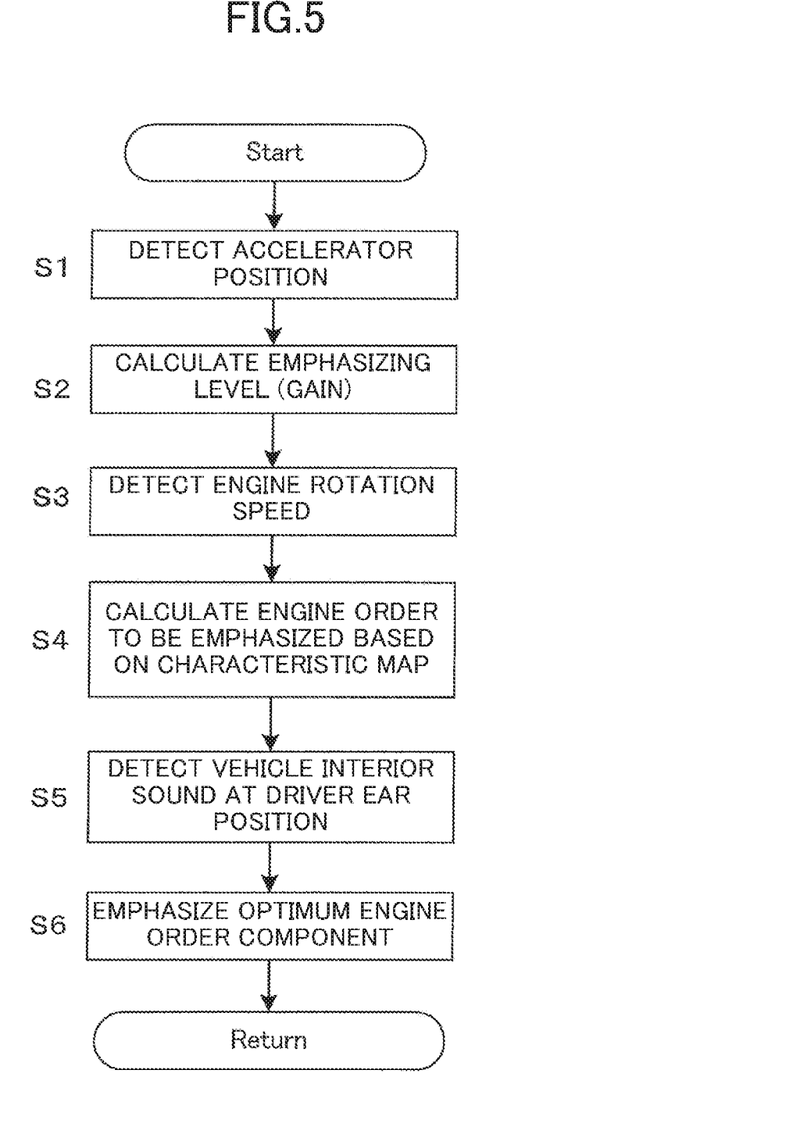
FIG. 5 is a flowchart showing a control procedure for an example of the vehicle sound control according to the present disclosure.

Next, the control procedure of the vehicle sound control according to the present disclosure will be described in accordance with the flowchart of FIG. 5. In the vehicle sound control, first, the accelerator position is detected in step S1, and in the subsequent step S2, the emphasizing level (gain) is determined based on the accelerator position.

In step S3, the engine rotation speed is detected, and in the subsequent step S4, the engine order to be emphasized (optimum engine order) is determined based on the characteristics map. In step S5, the vehicle interior sound at an ear position of the vehicle driver is detected.

In step S6, control of emphasizing the optimum engine order component is performed based on the emphasizing level, the engine order, and the detected vehicle interior sound (phase) determined in the previous steps. Specifically, the engine sound is controlled to become an easily perceived state for the driver by executing a process such as (1) producing a sound having the same phase as the phase of the optimum engine order, (2) producing a sound having the opposite phase to the phase of an engine order other than the optimum engine order, and (3) attenuating an audio sound corresponding to the optimum engine order, whereby control of one cycle is terminated.

While the embodiment of the present disclosure has been described, the present disclosure is not limited to the above embodiment, but appropriate modifications may be made within the scope of the appended claims. For example, although the above embodiment has been described taking an engine-driven vehicle as an example, the present disclosure is also applicable to vehicles driven by motors other than engines, such as electric motors. In this case, the order component to be emphasized in the sound of a motor may be set in accordance with the rotation speed of the motor.

INDUSTRIAL APPLICABILITY

The present disclosure can be used for controlling the interior sound of a vehicle to become an optimum state for driving.

DESCRIPTION OF REFERENCE CHARACTERS

U Controller
1 Accelerator Position Detector
2 Engine Rotation Speed Detector (Motor Rotation Speed Detector)
3 Vehicle Interior Sound Detector
4 Speaker
5 Emphasizing Level Determination Unit
6 Emphasizing Engine Order Setting Unit (Emphasizing Order Setting Unit)
7 Vehicle Interior Sound Control Unit

The invention claimed is:

1. A vehicle sound control device, comprising:
a motor rotation speed detector configured to detect a rotation speed of a motor that drives a vehicle;
a speaker configured to produce a vehicle interior sound including a motor sound changing in accordance with the rotation speed of the motor in an interior of the vehicle;
an emphasizing order setting unit configured to determine an order component to be emphasized in the motor sound in accordance with the rotation speed detected by the motor rotation speed detector; and
a vehicle interior sound control unit configured to control the vehicle interior sound produced by the speaker so that the emphasizing order component determined by the emphasizing order setting unit is emphasized,
wherein
the emphasizing order setting unit determines the order component to be emphasized so that a higher order component is emphasized as the rotation speed increases.

2. The vehicle sound control device of claim 1, wherein the vehicle interior sound control unit performs control of intensifying the emphasizing order component of the vehicle interior sound.

3. The vehicle sound control device of claim 1, wherein the vehicle interior sound control unit performs control of weakening a component other than the emphasizing order component of the vehicle interior sound.

4. The vehicle sound control device of claim 1, wherein the speaker can produce the motor sound and an audio sound from an audio apparatus, and
the vehicle interior sound control unit performs control of weakening a frequency component of the audio sound overlapping the emphasizing order component.

5. The vehicle sound control device of claim 1, further comprising:
a vehicle interior sound detector configured to detect a vehicle interior sound at an ear position of an occupant of the vehicle, wherein
the vehicle interior sound control unit produces, using a phase of the vehicle interior sound detected by the vehicle interior sound detector, the emphasizing order component of the motor sound having the same phase as the phase of the detected sound, or a component other than the emphasizing order component of the motor sound having the opposite phase to the phase of the detected sound.

6. The vehicle sound control device of claim 1, wherein the emphasizing order setting unit changes the emphasizing order from second-order to fourth-order, sixth-order, and eighth-order in this order as the rotation speed of the motor increases.

7. The vehicle sound control device of claim 1, wherein the vehicle interior sound control unit performs control in which the emphasizing order component is more emphasized than a component other than the emphasizing order component.

* * * * *